United States Patent
Zhou et al.

(10) Patent No.: US 10,146,350 B2
(45) Date of Patent: Dec. 4, 2018

(54) TOUCH DISPLAY APPARATUS

(71) Applicant: SHANGHAI TIANMA MICRO-ELECTRONICS CO., LTD., Shanghai (CN)

(72) Inventors: Xingyao Zhou, Shanghai (CN); Lihua Wang, Shanghai (CN); Qijun Yao, Shanghai (CN); Yang Zeng, Shanghai (CN)

(73) Assignee: SHANGHAI TIANMA MICRO-ELECTRONICS CO., LTD., Shanghai, P.R. (CN)

( * ) Notice: Subject to any disclaimer, the term of this patent is extended or adjusted under 35 U.S.C. 154(b) by 0 days.

(21) Appl. No.: 15/791,166

(22) Filed: Oct. 23, 2017

(65) Prior Publication Data
US 2018/0046301 A1 Feb. 15, 2018

(30) Foreign Application Priority Data

May 2, 2017 (CN) .......................... 2017 1 0302100

(51) Int. Cl.
G06F 3/041 (2006.01)
G06F 3/047 (2006.01)
G06F 3/044 (2006.01)

(52) U.S. Cl.
CPC ............ *G06F 3/0412* (2013.01); *G06F 3/044* (2013.01); *G06F 3/047* (2013.01); *G06F 2203/04112* (2013.01)

(58) Field of Classification Search
CPC ........ G06F 3/0412; G06F 3/044; G06F 3/047; G06F 2203/04112
See application file for complete search history.

(56) References Cited

U.S. PATENT DOCUMENTS

| | | | |
|---|---|---|---|
| 2011/0202875 A1* | 8/2011 | Kimura ................. | G06F 3/0412 715/810 |
| 2013/0194519 A1* | 8/2013 | Ivanov ................ | G02F 1/13338 349/12 |
| 2014/0092326 A1* | 4/2014 | Zhou .................... | G06F 3/0412 349/12 |
| 2014/0168152 A1* | 6/2014 | Ishizaki .............. | G02F 1/13452 345/174 |

FOREIGN PATENT DOCUMENTS

CN 104657016 A 5/2015

* cited by examiner

*Primary Examiner* — Shaheda Abdin
(74) *Attorney, Agent, or Firm* — Alston & Bird LLP

(57) ABSTRACT

A touch display apparatus with a display region and a frame region is provided. The touch display apparatus includes a base substrate, a display function layer and a thin film encapsulation layer which are sequentially stacked. The display function layer is located in the display region. A touch electrode layer is arranged at a side, facing away from the base substrate, of the display function layer. The frame region includes a slope region adjacent to the display region. The thickness of the touch display apparatus in the slope region is gradually decreased outward from the display region. The touch electrode layer includes touch electrodes which form a grid of metallic wires. The grid density of the touch electrodes in the slope region is higher than that in the display region.

22 Claims, 12 Drawing Sheets

TOUCH DISPLAY APPARATUS

CROSS-REFERENCE TO RELATED APPLICATIONS

This application claims priority to a Chinese patent application No. CN201710302100. 3 filed on May 2, 2017, the disclosure of which is incorporated herein by reference in its entirety.

TECHNICAL FIELD

The present disclosure relates to the display field, and in particular relates to a touch display apparatus.

BACKGROUND

An organic light emitting diode (hereinafter, referred to as OLED) display is a self-luminous display. Compared with a liquid crystal display, no backlight source is required for the OLED display so that the OLED display is slimmer. Moreover, the OLED display further has advantages such as high luminance, low power consumption, wide viewing angle, high reaction speed, wide operation temperature range and the like. The OLED display is widely applied in various high-performance display fields due to the above advantages.

Touch electrodes in the OLED are provided as gridded metallic wires. As a result, on one hand, resistance of the touch electrodes is reduced, thereby improving touch sensitivity. On the other hand, since the touch electrodes are gridded metallic wires having good ductility, flex resistance of the touch electrodes has been further improved. The display panel is thinner in the frame region than the display region. So the strength of the touch signal between the touch electrodes formed by the gridded metallic wires in the frame region and the touch object (e.g., a finger) is weaker. Moreover, the touch sensitivity in the edges of the display region of the touch display apparatus is poorer than in rest of the display region because the touch electrodes at the edges of the display region are at least partly located in the frame region.

SUMMARY

The present disclosure provides a touch display apparatus, which reduces the touch signal strength difference between the display region and the frame region, by enhancing the touch sensitivity in the edges of the display region of the touch display apparatus.

Embodiments of the present disclosure provide a touch display apparatus having a display region and a frame region, including: a base substrate, a display function layer and a thin film encapsulation layer which are sequentially stacked. The display function layer is arranged in the display region. The thin film encapsulation layer is arranged to cover the display region and extend to the frame region. A touch electrode layer is arranged at a side, facing away from the base substrate, of the thin film encapsulation layer, and is arranged to cover the display region and extend to the frame region. The frame region includes a slope region adjacent to the display region, and a thickness of the touch display apparatus in the slope region is gradually decreased along a direction outward from the display region. The touch electrode layer includes touch electrodes arranged to cover the display region and extend to the slope region, and each of the touch electrodes is constructed of gridded metallic wires. A grid density of the touch electrodes located in the slope region is higher than the grid density of the touch electrodes located in the display region.

The touch display apparatus in accordance of the present disclosure has the display region and the frame region. The touch display apparatus includes the base substrate, the display function layer, the thin film encapsulation layer and the touch electrode layer. The thin film encapsulation is configured to protect the display function layer from being eroded by external moisture and oxygen. The frame region in the touch display apparatus in accordance of the present disclosure includes a slope region adjacent to the display region, and the thickness of the slope region is gradually decreased along the direction outward from the display region. Therefore, a distance between the touch electrodes in the touch electrode layer and a touch object (e.g., a finger) is gradually increased, causing a strength of a touch signal between the touch electrode in the frame region and the touch object is weaker than that in the display region. Due to the difference between the strength of the touch signals in the display region and the frame region, touch sensitivity at the edge of the display region of the touch display apparatus is degraded. In the present disclosure, by setting the grid density of the touch electrodes in the slope region higher than the grid density of the touch electrodes in the display region, the strength of the touch signal between the touch electrodes in the frame region and the touch object is enhanced (exemplary, by increasing the grid density of the touch electrode wires in the frame region, when the finger touches the edge of the display region, capacitance between the touch electrodes in the frame region and the finger is increased, thereby improving the strength of the touch signal). Therefore, the difference between the strength of the touch signals in the display region and the frame region is decreased, so that the touch sensitivity at the edge of the display region of the touch display apparatus is enhanced.

BRIEF DESCRIPTION OF DRAWINGS

FIG. 1b is a schematic cross sectional view along line AA' in FIG. 1a;

FIG. 1c is a schematic diagram illustrating partial structure in R4 region in FIG. 1a;

FIG. 2b is a schematic cross sectional view along line BB' in FIG. 2a;

FIG. 3b is a schematic cross sectional view along line CC' in FIG. 3a;

FIG. 4b is a schematic cross sectional view along line DD' in FIG. 4a;

DETAILED DESCRIPTION

Figure 1A:
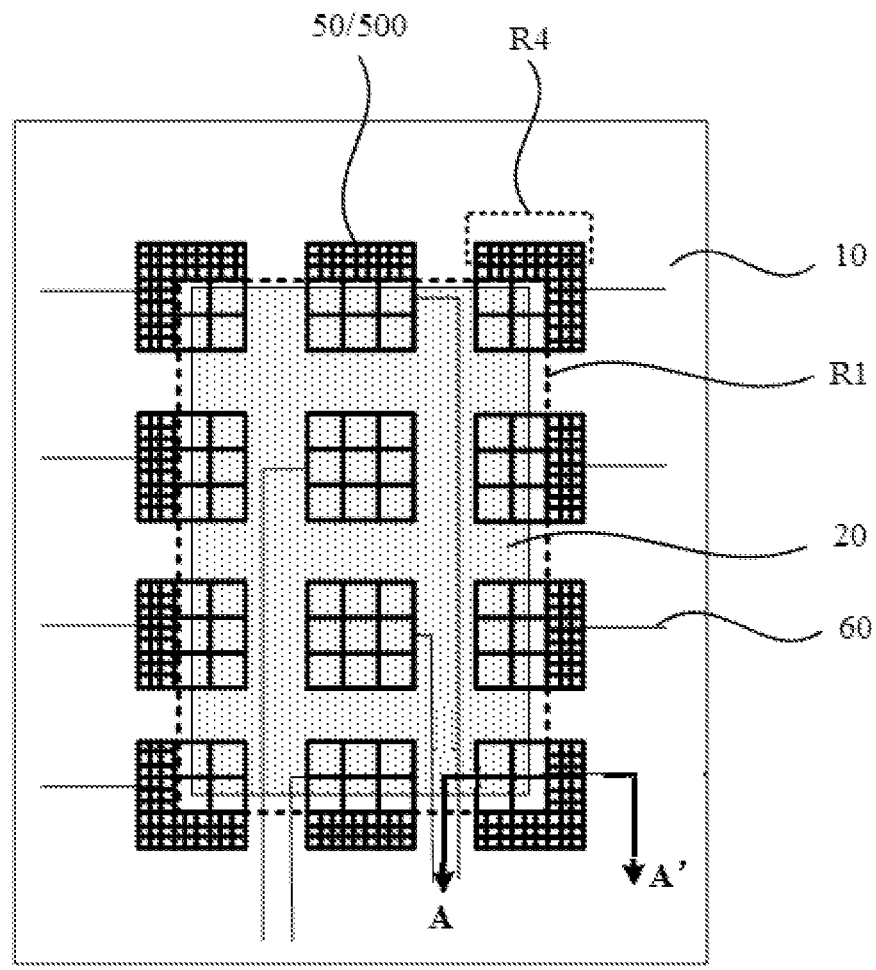
FIG. 1a is a schematic top view illustrating a structure of a touch display apparatus in accordance of embodiments of the present disclosure.

The present disclosure is further described below in combination with the drawings and embodiments. It should be understood that, the specific embodiments described herein are merely used to explain the present disclosure rather than limiting the present disclosure. In addition, it should be stated that, in order to facilitate the description, merely a part of structures related to the present disclosure rather than the whole structure are illustrated in the drawings.

Figure 1B:
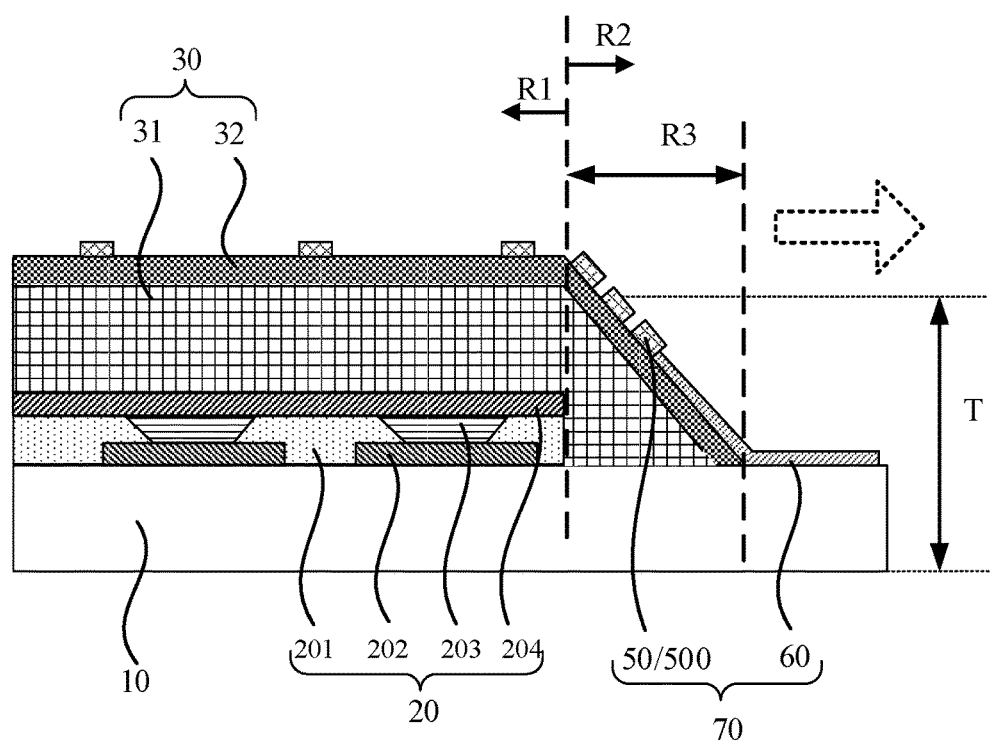

FIG. 1a is a schematic top view illustrating a structure of a touch display apparatus in accordance of embodiments of the present disclosure, and FIG. 1b is a cross sectional view along line AA' in FIG. 1a. Referring to FIG. 1a and FIG. 1b, the touch display apparatus has a display region R1 and a frame region R2. The display region R1 is configured to display information such as images and texts. The touch display apparatus may be a display panel, or may be a product including the display panel, such as a mobile phone, a tablet computer, an E-book and the like. The touch display apparatus in accordance of embodiments of the present disclosure includes a base substrate 10, a display function layer 20 and a thin film encapsulation layer 30 which are sequentially arranged. The display function layer 20 is located in the display region R1. Optionally, the display function layer 20 includes an anode 202, a light emitting function layer 203 and a cathode 204. When an external electric field is applied, electrons and holes are injected into a light emitting material layer of the light emitting function layer 203 from the cathode 204 and the anode 202 respectively, and recombined to generate excitons. The excitons are driven to migrate by the external electric field, the energy is delivered to light emitting molecules in the light emitting material layer, and the electrons are activated to transit from ground state to excitation state. Then, the energy of the excitation state is released through radiative transition so as to generate light rays. The thin film encapsulation layer 30 covers the display region R1 and extends to the frame region R2. A touch electrode layer 70 is arranged at a side, facing away from the base substrate 10, of the thin film encapsulation layer 30. The touch electrode layer 70 covers the display region R1 and extends to the frame region R2. The frame region R2 includes a slope region R3 adjacent to the display region R1. In a direction outward from the display region R1 (the direction represented by a dotted arrow in FIG. 1b), the thickness T of the touch display apparatus in the slope region R3 is gradually decreased. The touch electrode layer 70 includes touch electrodes 50. The touch electrodes 50 cover the display region R1 and extend to the slope region R3. The touch electrodes are provided as gridded metallic wires, and the grid density of the touch electrode 50 located in the slope region R3 is higher than the grid density of the touch electrode 50 located in the display region R1.

The touch display apparatus in accordance of the embodiments of the present disclosure has the display region and the frame region, and includes the base substrate, the display function layer and the touch electrode layer. The thin film encapsulation is configured to protect the display function layer from being eroded by external moisture and oxygen. Since the display function layer is located in the display region rather than the frame region, the touch display apparatus has different thicknesses in the frame region and the display region. Specifically, the thickness in the frame region is smaller than the thickness in the display region, and the thickness of the touch display apparatus in the frame region is gradually decreased in the direction outward from the display region. The slope region is in the frame region and adjacent to the display region, and the thickness of the touch display apparatus in the slope region is gradually decreased along the direction outward from the display region. It should be noted, the slope region is adjacent to the display region, that is to say, at least a part of a boundary of the slope region is shared with the display region and no other region is arranged between the slope region and the display region. Since the slope region is adjacent to the display region and the thickness in the frame region is gradually decreased in the direction outward from the display region, the distance between the touch electrodes in the touch electrode layer and a touch object (e.g., a finger) is gradually increased. As a result, the strength of the touch signal between the touch electrode in the frame region and the touch object is weaker than the strength of the touch signal between the touch electrode in the display region and the touch object. Due to the difference in the strength of the touch signal between the display region and the frame region, the touch sensitivity at the edge of the display region of the touch display apparatus is reduced. In the embodiments of the present disclosure, the grid density of the touch electrodes in the slope region is set to be higher than the grid density of the touch electrodes in the display region, so that the strength of the touch signal generated between the touch electrodes in the frame region and the touch object is enhanced (exemplary, if the grid density of the touch electrode wires in the frame region is increased, when the edge of the display region is touched by the finger, the capacitance between the touch electrodes in the frame region and the finger is increased, thereby enhancing the strength of the touch signal). Therefore, the difference between the strength of the touch signal in the display region and the strength of the touch signal in the frame region is decreased, and the touch sensitivity at the edge of the display region of the touch display apparatus is enhanced.

Figure 1C:
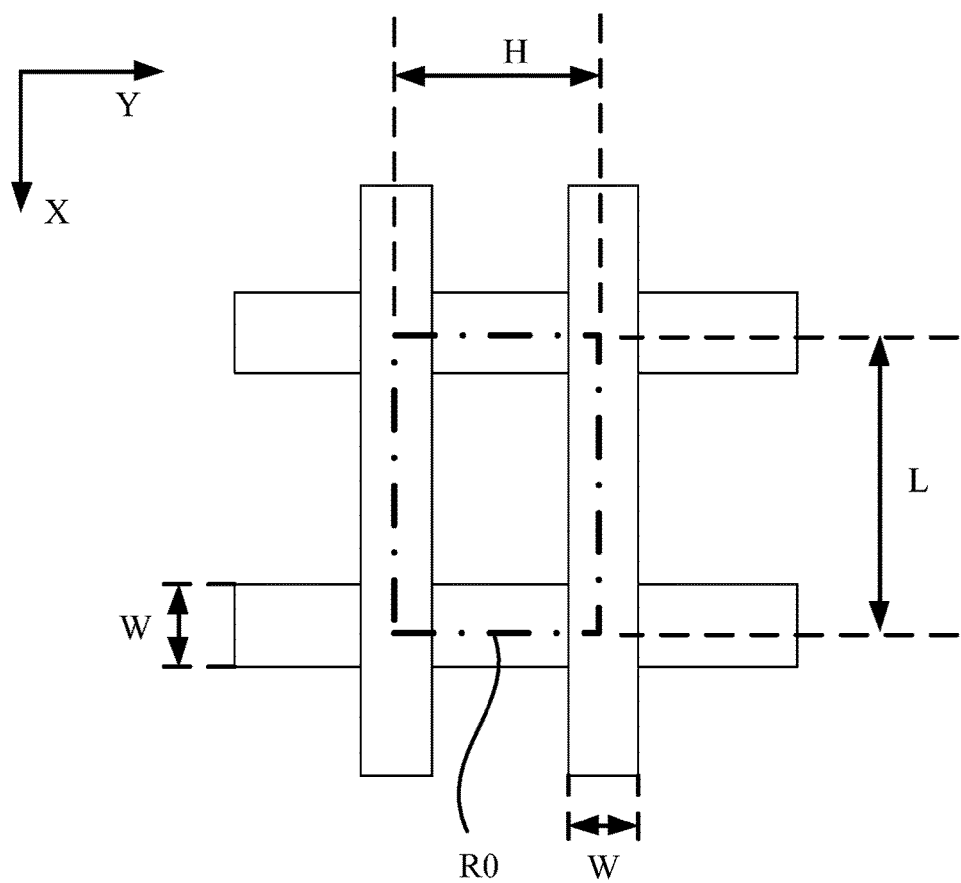

FIG. 1c is a schematic diagram illustrating partial structure in R4 region in FIG. 1a. As shown in FIG. 1c, W indicates a line width of the metallic wires; L indicates a spacing, in a row direction (X direction), between adjacent metallic wires among the metallic wires extending in Y direction; H indicates an spacing, in a column direction (Y direction), between adjacent metallic wires among the metallic wires extending along the X direction, and the X direction is perpendicular to the Y direction. The grid density of the touch electrode is a ratio of the area of a region occupied by the metallic wires to the area of the touch electrode. Referring to FIG. 1c, the grid density of the touch electrode is a ratio of the area of the metallic wires in region R0 to the area of the region R0, i.e., the grid density of the touch electrode is as follows:

$$\rho = (LW + HW - W^2)/LH.$$

The grid density of the touch electrode represents a density of the gridded metallic wires forming the touch electrode. In the case that other conditions remain unchanged, that is, in the case that the spacing L between adjacent metallic wires in the row direction (X direction) and the spacing H between adjacent metallic wires in the column direction (Y direction) are not changed, the grid density of the touch electrodes may be increased by increasing the line width W of the metallic wires. In the case that other conditions remain unchanged, that is, in the case that the spacing L between adjacent metallic wires in the row direction (X direction) and the line width of the metallic wires W are not changed, the grid density of the touch electrodes may be increased by decreasing the value of the spacing H between adjacent metallic wires in the column direction (Y direction). In the case that other conditions remain unchanged, that is, in the case that the spacing H between adjacent metallic wires in the column direction (Y direction) and the line width of the metallic wires W are not changed, the grid density of the touch electrode may be increased by decreasing the value of the spacing L between adjacent metallic wires in the row direction (X direction). In the case that the line width W of the metallic wires remains unchanged, the grid density of the touch electrode may be increased by decreasing the value of the spacing L between adjacent metallic wires in the row direction (X direction) and the value of the spacing H between adjacent metallic wires in the column direction (Y direction).

Optionally, referring to FIG. 1a and FIG. 1b, the touch electrode layer 70 includes a plurality of touch electrode blocks 500 located at the same layer, and the plurality of touch electrode blocks 500 are arranged in an array. It should be noted, the touch electrode block 500 with a shape of rectangle is described as an example. However, in other alternative embodiments, the shape of the touch electrode block may be a rhombus or a polygon, which is not limited in embodiments of the present disclosure.

Optionally, referring to FIG. 1a and FIG. 1b, the touch electrode layer 70 further includes a plurality of touch electrode wires 60. The plurality of touch electrode wires 60 and the plurality of touch electrode blocks 500 are arranged at the same layer, each touch electrode block 500 is electrically connected with at least one of the touch electrode wires 60 and insulated with other touch electrode wires.

Specifically, as shown in FIG. 1a and FIG. 1b, the plurality of touch electrode blocks 500 are arranged in an array longitudinally and transversely, and is insulated with each other. Each of the touch electrode wires 60 is electrically connected with one of the touch electrode blocks 500, and is insulated with other touch electrode blocks. Each of the touch electrode blocks 500 and the ground with zero potential energy form a capacitor. When the finger touches or approaches the touch display apparatus, the capacitance at the touch position is increased. Therefore, during a touch detection, the position of a touch point can be determined by detecting the change of corresponding capacitance.

Optionally, referring to FIG. 1a and FIG. 1b, the thin film encapsulation layer 30 includes at least one organic layer 31 and at least one inorganic layer 32. The touch electrode layer 70 is disposed at a surface, facing away from the base substrate 10, of the organic layer 31 or the inorganic layer 32 of the thin film encapsulation layer 30.

Specifically, in some optional implementations, referring to FIG. 1a and FIG. 1b, the touch display apparatus may include the touch electrode layer 70, the inorganic layer 32, the organic layer 31, the display function layer 20 and the base substrate 10 stacked successively from top to bottom. The display function layer 20 includes a pixel defining layer 201, the anode 202, the light emitting function layer 203 and the cathode 204. The touch electrode layer 70 includes the touch electrode 50 and the touch electrode wires 60 electrically connected with the touch electrode blocks 500 in the touch electrode 50, and is disposed at a surface, facing away from the base substrate 10, of one of the inorganic layers 32 of the thin film encapsulation layer 30. It should be noted, in other embodiments of the present disclosure, the touch electrode layer 70 may also be disposed at a surface, facing away from the surface of the base substrate 10, of one of the organic layers 31 of the thin film encapsulation layer 30, and the touch electrode 50 and the touch electrode wires 60 may be disposed on different layers and be electrically connected via through holes. The inorganic layer has a dense structure and better barrier performance for the moisture and the oxygen than the organic layer. However, a film-forming property, flatness and homogeneity of the inorganic layer are not good enough, and small cracks and pinholes may be formed due to process factors. The organic layer has good film-forming property, and can prevent the moisture and the oxygen from further permeating into the touch display apparatus via the cracks and pinholes mentioned above, thereby overcoming the above-mentioned defects. Since the moisture and the oxygen are prevented from passing, the encapsulation performance is further improved, and an internal force in the inorganic layer is effectively decreased. Therefore, to entirely improve the encapsulation performance of the thin film encapsulation layer, the thin film encapsulation layer is formed as a stacked structure composed of the organic layers and the inorganic layers. In such stacked structure, the organic layers and the inorganic layers are stacked alternatively, and are complementary in structures to be formed as insulation units for the moisture and the oxygen. The number and the stacking order of the organic layers and the inorganic layers in the thin film encapsulation are not limited in the embodiments of the present disclosure.

Figure 2A:
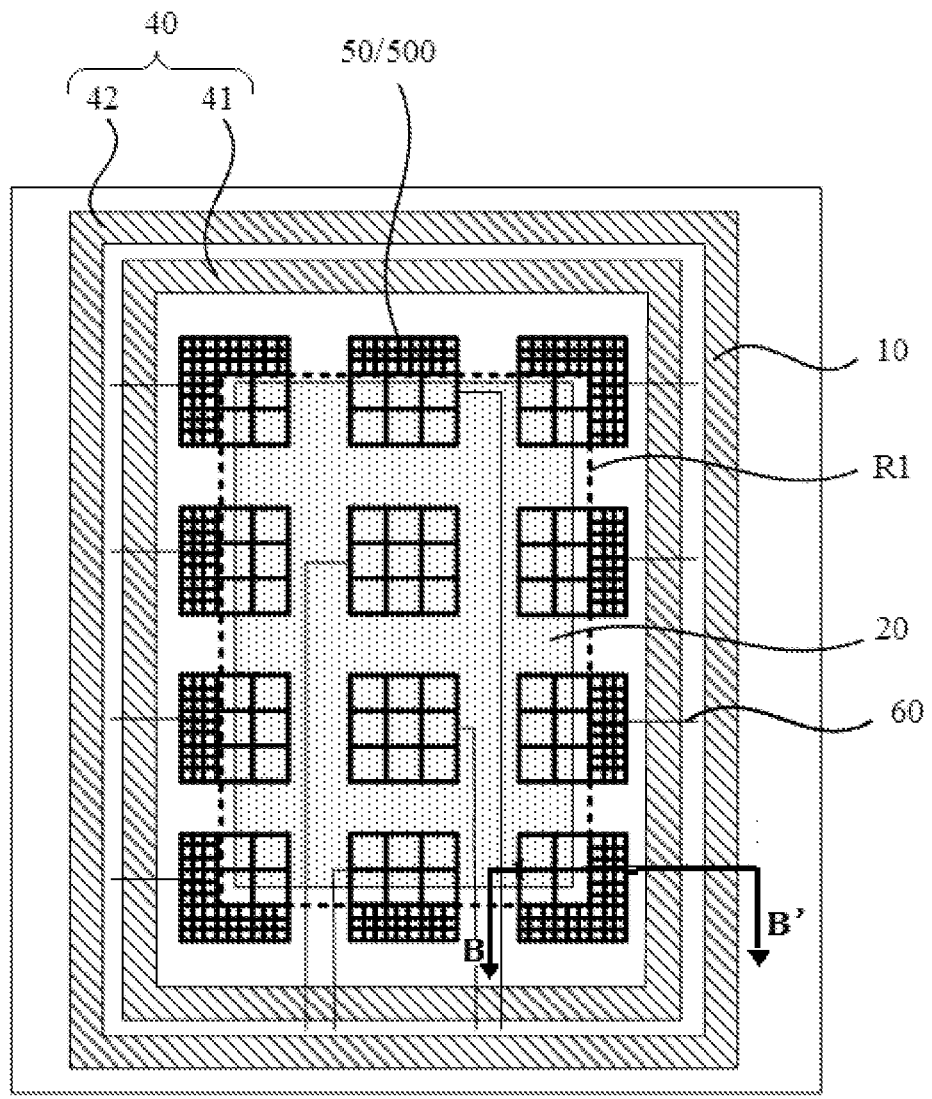
FIG. 2a is a schematic top view illustrating a structure of another touch display apparatus in accordance of embodiments of the present disclosure.
Figure 2B:
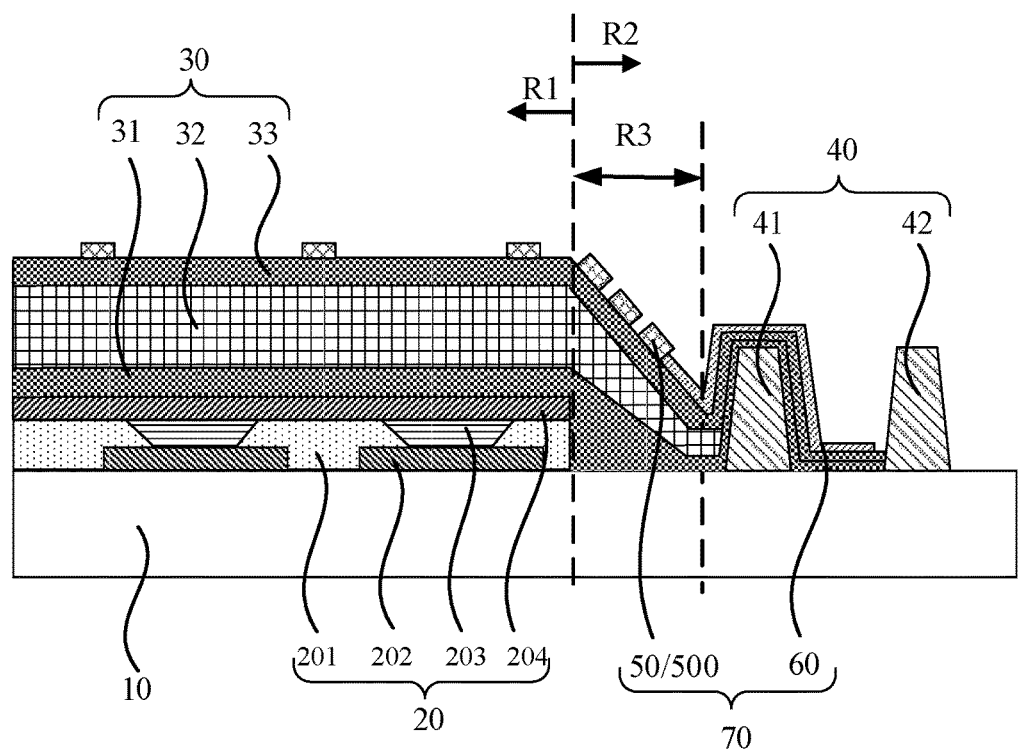

FIG. 2a is a schematic top view illustrating a structure of another touch display apparatus in accordance of embodiments of the present disclosure, FIG. 2b is a schematic cross sectional view along line BB' in FIG. 2a. Referring to FIG. 2a and FIG. 2b, the thin film encapsulation layer 30 sequentially includes a first inorganic layer 31, an organic layer 32 and a second inorganic layer 33.

The touch electrode layer is disposed at a surface, facing away from the base substrate, of one of the organic layers or one of the inorganic layers in the thin film encapsulation layer. Specifically, referring to FIG. 2a and FIG. 2b, the touch electrode layer 70 is disposed at a surface, facing away from the base substrate 10, of the second inorganic layer 33 in the thin film encapsulation 30. In other embodiments, the touch electrode layer 70 may be disposed at a surface, facing away from the base substrate 10, of the organic layer 32 in the thin film encapsulation 30, which is not limited in the present disclosure.

Optionally, referring to FIG. 2a and FIG. 2b, the touch display apparatus in accordance of the embodiments of the present disclosure further includes at least one annular barrier wall 40. The annular barrier wall 40 is located in the frame region R2 and is arranged to encompass the display region R1, so as to prevent the thin film encapsulation layer 30 from extending outward, thereby achieving the narrow frame design and effectively blocking the moisture and the oxygen. It should be noted, in the FIG. 2a and FIG. 2b, a touch display apparatus with two annular barrier walls is described as an example, in other optional embodiments, the touch display apparatus in accordance of the embodiments of the present disclosure may include one or more annular barrier walls.

Optionally, referring to FIG. 2a and FIG. 2b, the at least one barrier wall 40 includes a first barrier wall 41 arranged to be adjacent to the display region R1 and a second barrier wall 42 encircling the first barrier wall 41. Due to an enclosed construction formed by the second barrier wall 42 around the first barrier wall 41, in the extension direction of the thin film encapsulation, namely a flank of the thin film encapsulation layer, the moisture and the oxygen can be better blocked, and the touch display apparatus is protected from being eroded by the moisture and the oxygen. The organic layer 32 extends to a region between the display region R1 and the first barrier wall 41. The first inorganic layer 31 and the second inorganic layer 33 both extend to a region between the first barrier wall 41 and the second barrier wall 42. Since the inorganic layer (the first inorganic layer 31 and the second inorganic layer 33) has better performance in blocking the moisture and the oxygen than the organic layer (the organic layer 32), by having the organic layer 32 covered by the second inorganic layer 33 and sandwiched between the first inorganic layer 31 and the second inorganic layer 33, the touch display apparatus can effectively block the moisture and the oxygen in the direction perpendicular to the extension direction of the thin film encapsulation layer.

Figure 3A:
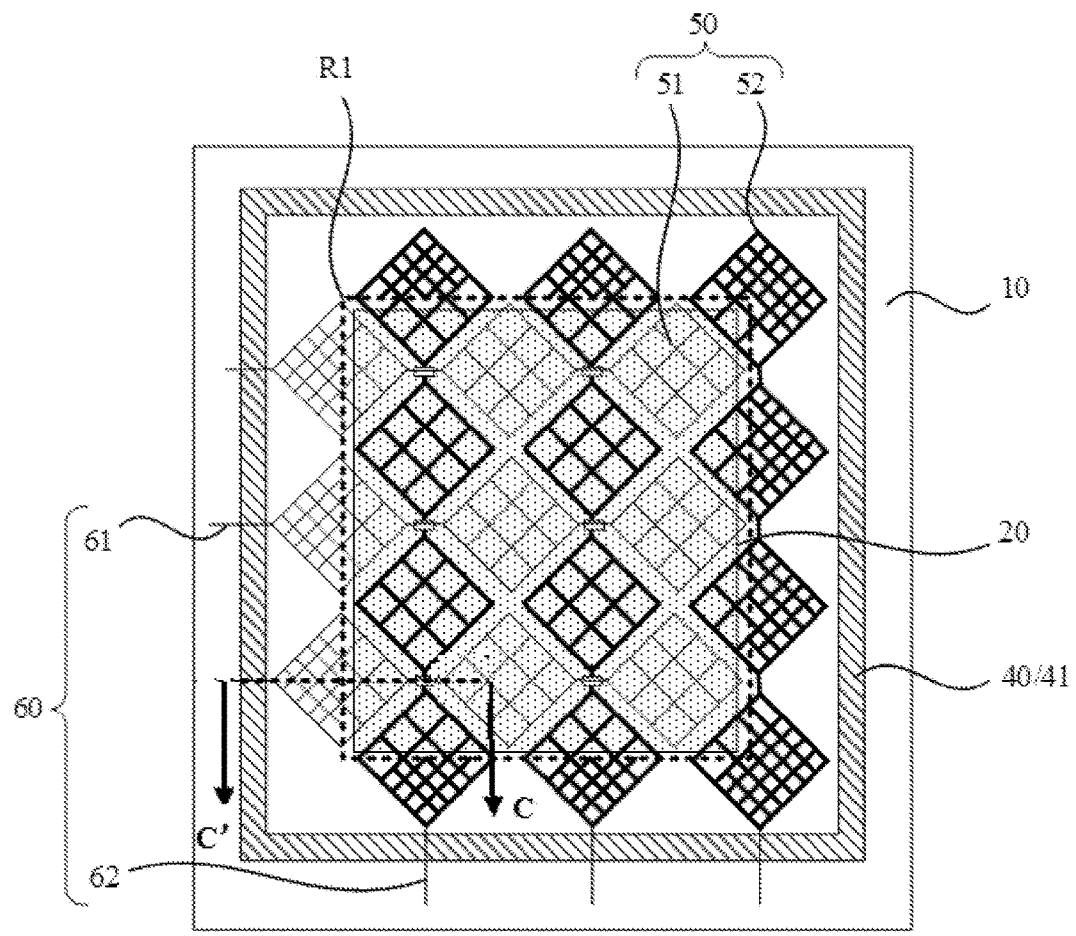
FIG. 3a is a schematic top view illustrating a structure of another touch display apparatus in accordance of embodiments of the present disclosure.
Figure 3B:
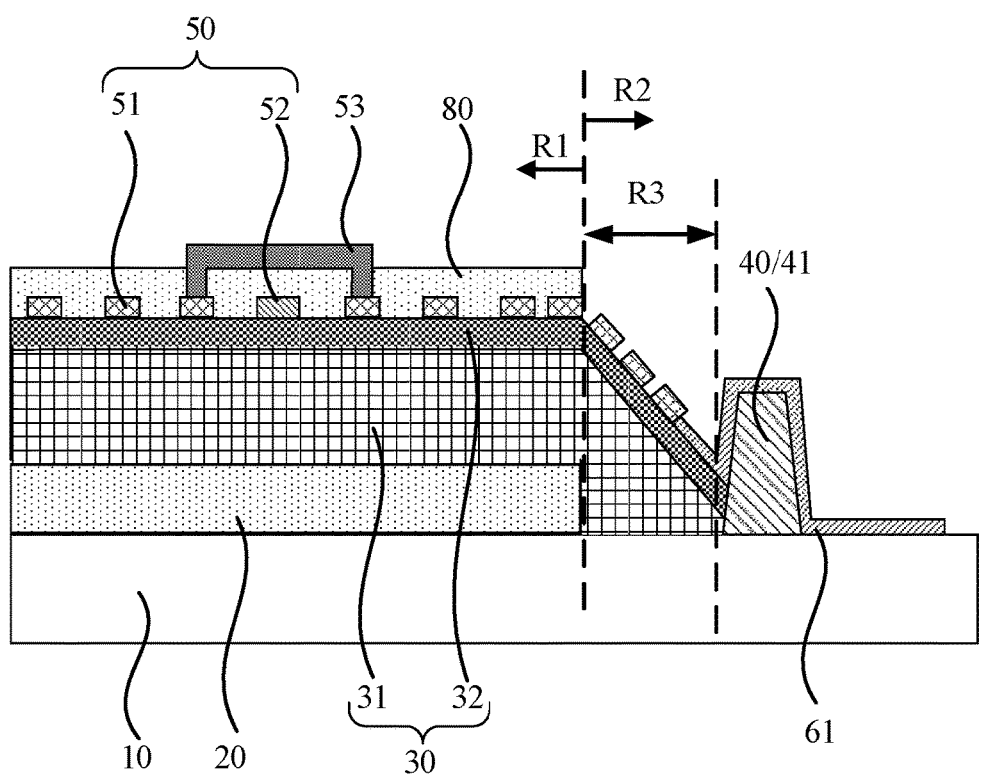

FIG. 3a is a schematic top view illustrating another touch display apparatus in accordance of embodiments of the present disclosure, FIG. 3b is a schematic cross sectional view along line CC' in FIG. 3a. Referring to FIG. 3a and FIG. 3b, the touch electrode layer 70 includes a plurality of touch sensing electrodes 51 and a plurality of touch driving electrodes 52. The plurality of touch sensing electrodes 51 and the plurality of touch driving electrodes 52 are insulated and arranged at the same layer. At intersection points between the touch sensing electrodes 51 and the touch driving electrodes 52, the plurality of touch sensing electrodes 51 are connected through bridge connectors 53 which are arranged in a layer different from the touch sensing electrodes 51. An electrode insulation layer 80 is arranged between the bridge connectors 53 and the touch electrode layer 70, and is configured to make the touch sensing electrode 51 to be insulated from the touch driving electrode 52. The materials of the bridge connectors 53 may be metal materials. It should be understood, in an embodiment, the electrode insulation layer 80 may arranged at positions where the touch sensing electrodes 51 and the touch driving electrodes 52 are intersected, and the plurality of touch electrodes are connected through the bridge connectors located in a different layer.

Specifically, referring to FIG. 3a and FIG. 3b, the plurality of touch sensing electrodes 51 and the plurality of touch driving electrodes 52 are insulated and arranged at the same layer. The touch electrode wires 60 include touch sensing electrode wires 61 and touch driving electrode wires 62. One end of each touch sensing electrode wire 61 is electrically connected with the touch sensing electrode 51, while the other end of each touch driving electrode wire 61 is electrically connected with an external drive circuit (not shown in the drawings) across the barrier wall 40. One end of each touch driving electrode wire 62 is electrically connected with the touch driving electrode 52, while the other end of each touch driving electrode wire 62 is electrically connected with the external drive circuit (not shown in the drawings) across the barrier wall 40. By arranging the touch sensing electrodes and the touch driving electrodes at the same layer, the touch display apparatus is made slimmer.

Figure 4A:
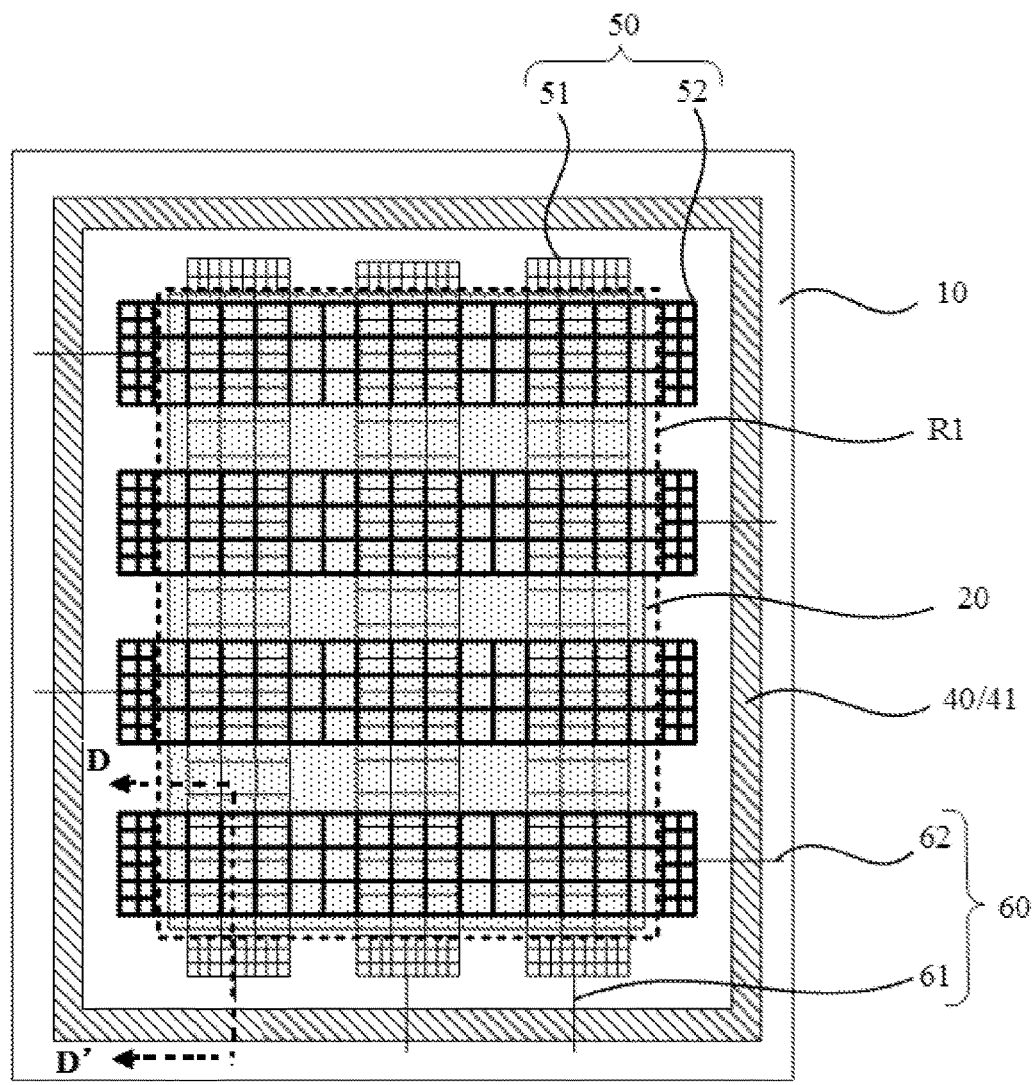
FIG. 4a is a schematic top view illustrating a structure diagram for another touch display apparatus in accordance of embodiments of the present disclosure.
Figure 4B:
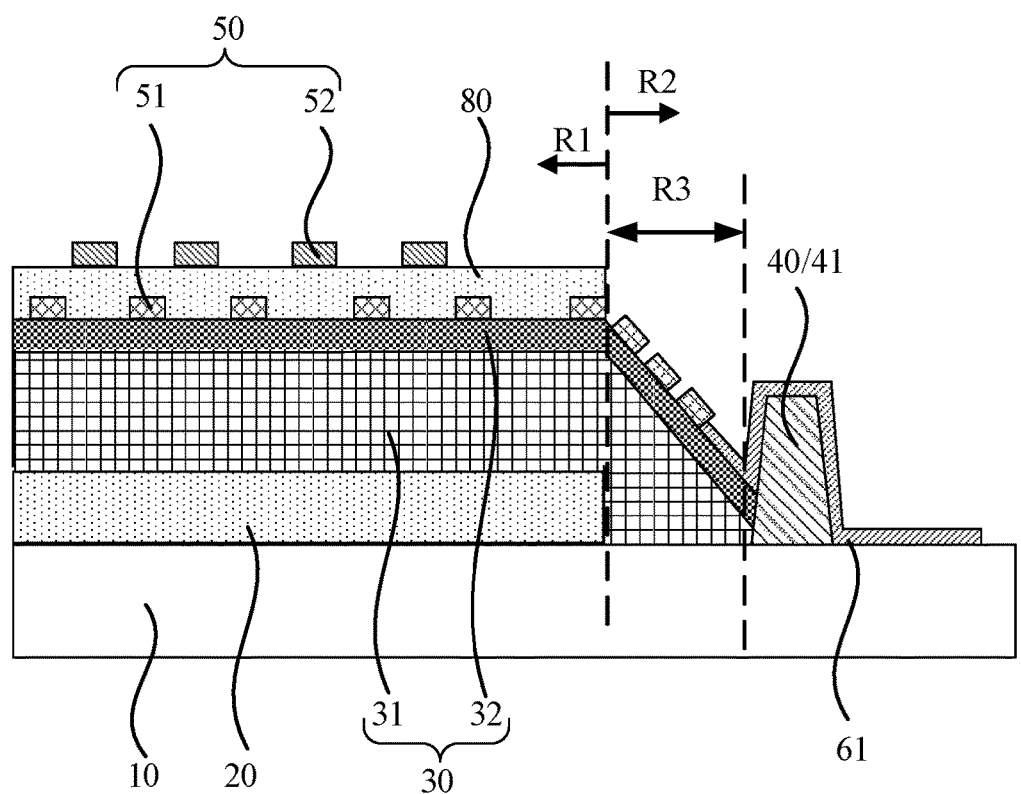

FIG. 4a is a schematic top view illustrating a structure of another touch display apparatus in accordance of embodiments of the present disclosure, FIG. 4b is a schematic cross sectional view along line DD' in FIG. 4a. Referring to FIG. 4a and FIG. 4b, the touch electrode layer 70 includes a plurality of the touch sensing electrodes 51 arranged at the same layer and a plurality of the touch driving electrodes 52 arranged at the same layer. The plurality of the touch sensing electrodes 51 and the plurality of touch driving electrodes 52 are arranged at different layers, and the insulation layer 80 is sandwiched between the plurality of touch sensing electrodes 51 and the plurality of touch driving electrodes 52.

Optionally, referring to FIG. 4a and FIG. 4b, the plurality of touch driving electrodes 52 are arranged in parallel and constructed as touch driving electrode columns. The plurality of touch sensing electrodes 51 are arranged in parallel and constructed as touch sensing electrode columns. The touch driving electrode columns and the touch sensing electrode columns intersect and insulate from each other.

Specifically, as shown in FIG. 4a and FIG. 4b, the plurality of touch sensing electrodes 51 and the plurality of touch driving electrodes 52 are insulated and intersected. The touch electrode wires 60 include the touch sensing electrode wires 61 and the touch driving electrode wires 62. One end of each touch sensing electrode wire 61 is electrically connected with the touch sensing electrode 51, while the other end of each touch sensing electrode wire 61 is electrically connected with the external drive circuit (not shown in the drawings) across the barrier wall 40. One end of each touch driving electrode wire 62 is electrically connected with the touch driving electrode 52, while the other end of each touch sensing electrode wire 62 is electrically connected with the external drive circuit (not shown in the drawings) across the barrier wall 40. The touch driving electrodes 52 may be used to receive a touch drive signal, and the touch sensing electrodes 51 may be used to generate a touch sensing signal. Referring to FIG. 4a and FIG. 4b, a mutual capacitance (coupled capacitance) is formed at a region where the touch sensing electrodes 51 and the touch driving electrodes 52 are intersected. When the human body touches the touch display apparatus, the capacitance detected by the touch sensing electrodes 51 is decreased and a corresponding touch sensing signal is generated. A specific position where the touch is occurred can be determined through further corresponding conversions.

Figure 5:
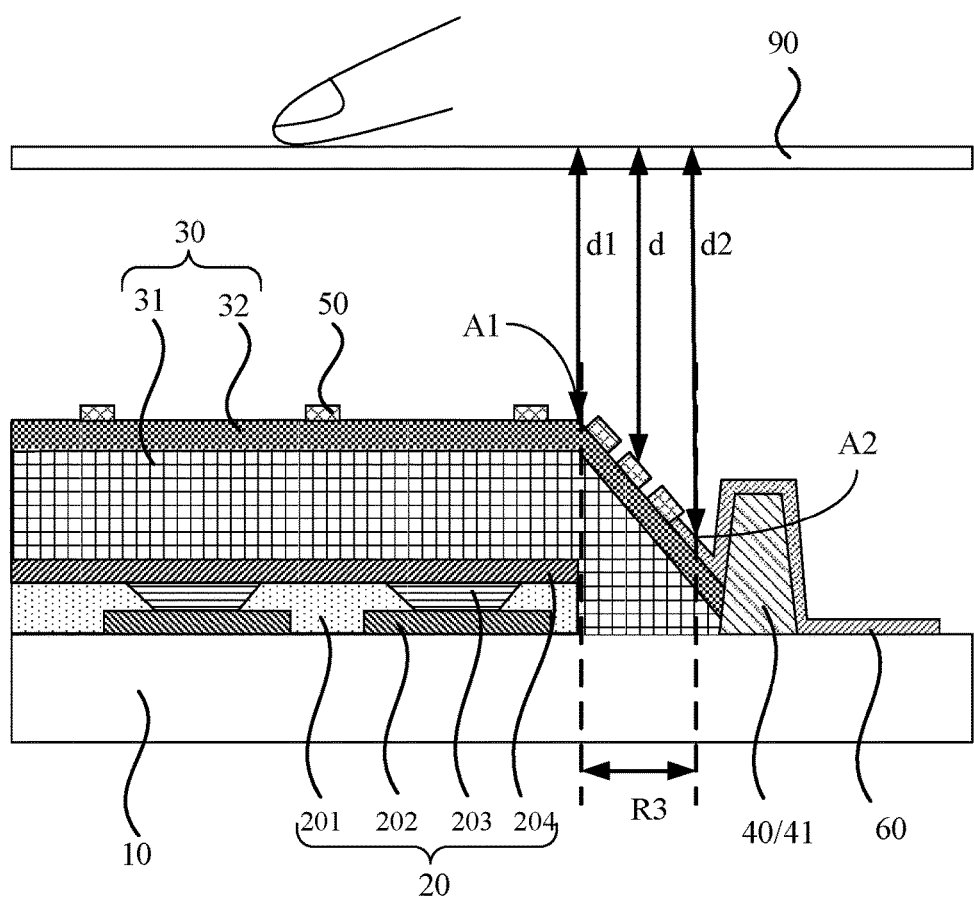
FIG. 5 is a schematic cross sectional view of another touch display apparatus in accordance of embodiments of the present disclosure.

FIG. 5 is a schematic cross sectional view illustrating a structure of another touch display apparatus in accordance of embodiments of the present disclosure. As shown in FIG. 5, the touch display apparatus in accordance of embodiments of the present disclosure further includes a protective layer 90 arranged at a side, facing away from the base substrate 10, of the thin film encapsulation layer 30. The protective layer 90 is configured to protect various components for displaying and touching in the touch display apparatus, for example, protect the components such as the display function layer and the touch electrodes from being eroded by the external moisture and the oxygen and mechanical damages.

Optionally, referring to FIG. 5, the protective layer 90 is at least one of a protective cover plate, a barrier film and a resin layer. Generally, the protective cover plate is a glass cover plate, such as an add-on protective cover plate in the mobile phone. The barrier film is a flexible protective layer similar to the thin film encapsulation layer, including multiple layers of inorganic layers and organic layers stacked. The material of the resin layer may be propylene type resin.

Optionally, referring to FIG. 5, the slope region R3 has two ends: a first end A1 close to the display region R1, a second end A2 which is far away from the display region R1. The thickness of the touch display apparatus in the slope region R3 is gradually decreased from the first end A1 of the slope region R3 to the second end A2 of the slope region R3. d1 is a distance between one surface, facing away from the touch electrode 50, of the protective layer 90 and the first end A1, d2 is a distance between the surface, facing away from the touch electrode 50, of the protective layer 90 and the second end A2. The grids of the touch electrodes 50 in the slope region R3 are evenly distributed. ρ1 is the grid density of the touch electrodes 50 in the display region R1, ρ2 is the grid density of the touch electrodes 50 in the slope region R3. A ratio of the grid density of the touch electrodes 50 in the slope region R3 to the grid density of the touch electrodes 50 in the slope region R1 meets the following formulations: ρ2/ρ1=d/d1, d=(d2−d1)/(lnd2−lnd1), where lnd1 is a natural logarithm of d1 and lnd2 is the natural logarithm of d2.

Figure 6:
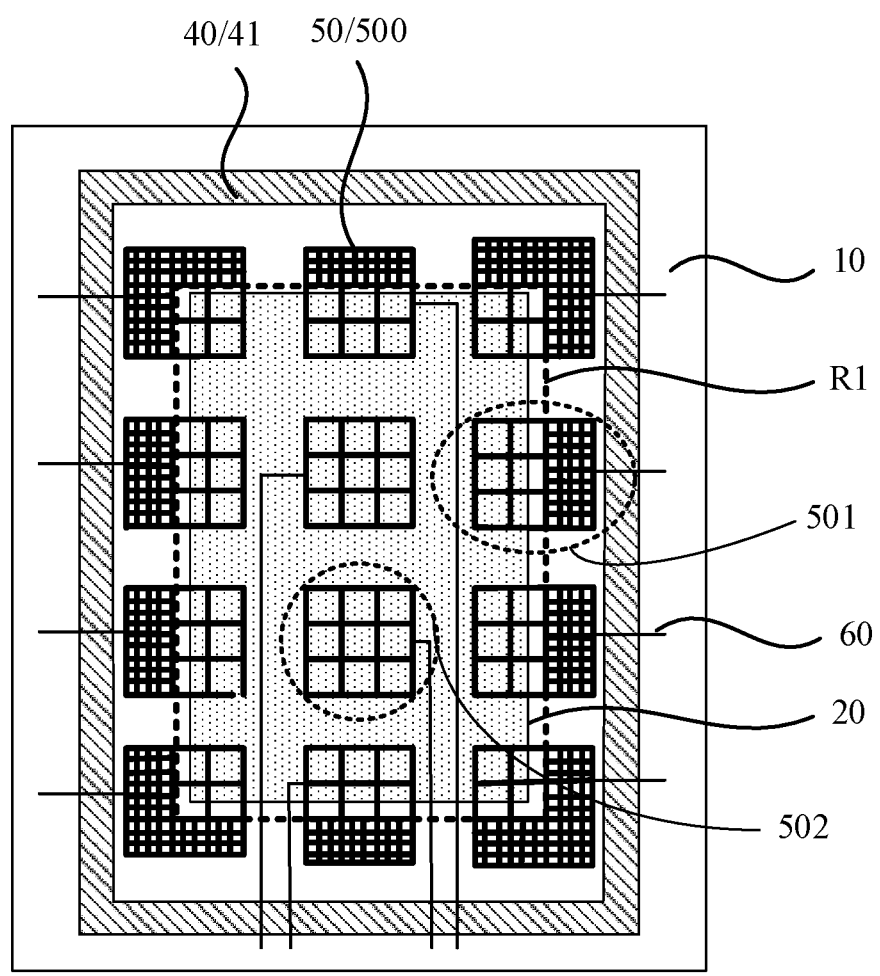
FIG. 6 is a schematic top view illustrating a structure of another touch display apparatus in accordance of embodiments of the present disclosure.

FIG. 6 is a schematic top view illustrating a structure of another touch display apparatus in accordance of embodiments of the present disclosure. Optionally, referring to FIG. 5 and FIG. 6, the area of any touch electrode block 500, at least a part of which is arranged in the slope region R3 (e.g., the touch electrode block 501 in FIG. 6), is S1, and the area of any touch electrode block 500 arranged in the display region R1 (e.g., the touch electrode block 502 in FIG. 6) is S2, where S1>S2. On the basis that the grid density of the touch electrodes 50 in the slope region R3 is higher than the grid density of the touch electrodes 50 in the display region R1, increasing the area of the touch electrode blocks in the slope region R3 may further enhance the strength of the touch signal generated between the touch electrode blocks 500 in the slope region R3 and the touch object (e.g., the finger). Therefore, the strength difference between the touch signals of the display region and the frame region is decreased, thereby enhancing the touch sensitivity of the edge of the display region of the touch display apparatus. The touch display apparatus in accordance of the embodiments of the present disclosure may be applied to a self-capacitance case. In other embodiments, similarly, the area of the touch driving electrodes and the touch sensing electrodes of the mutual-capacitance touch display apparatus may be increased, the specific settings are as follows.

Figure 7:
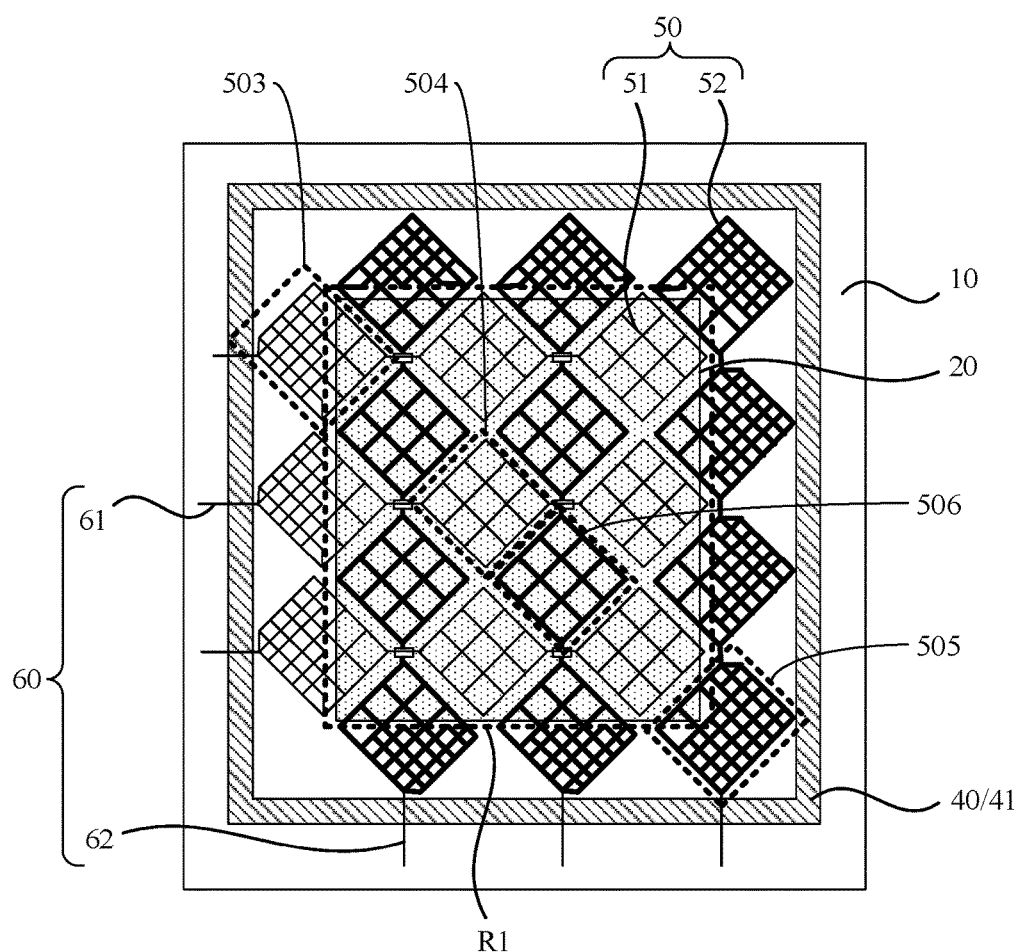
FIG. 7 is a schematic top view illustrating a structure of another touch display apparatus in accordance of embodiments of the present disclosure.

FIG. 7 is a schematic top view illustrating a structure of another touch display apparatus in accordance of embodiments of the present disclosure. The reference numerals in FIG. 7 are similar to the reference numerals in FIG. 3a, the same contents will no longer be described. Optionally, referring to FIG. 7, the area of any sensing electrode, at least a part of which is arranged in the slope region (e.g., the touch sensing electrode 503 in FIG. 7), is S3, and the area of any touch sensing electrode arranged in the display region (e.g., the touch sensing electrode 504 in FIG. 7) is S4, where S3>S4. Alternatively, the area of any touch driving electrode, at least a part of which is arranged in the slope region (e.g., the touch driving electrode 505 in FIG. 7), is S5, and the area of any touch driving electrode arranged in the display region (e.g., the touch driving electrode 506 in FIG. 7) is S6, where S5>S6.

Optionally, on the basis of the above mentioned embodiments, the metallic wires of the touch electrodes are set to have a larger line width in the slope region than that in the display region. Exemplarily, referring to FIG. 1c, in the case that the spacing L between adjacent metallic wires in the row direction and the spacing H between adjacent metallic wires in the column direction are not changed, by increasing the line width W of the metallic wires of the touch electrodes, the grid density of the touch electrode wires in the slope region is increased, thereby enhancing the touch sensitivity at the edge of the display region of the touch display apparatus.

Optionally, on the basis of the above mentioned embodiments, for the gridded metallic wires of the touch electrodes in the slope region, the spacing between adjacent metallic wires in the row direction and the spacing between adjacent metallic wires in the column direction are both set as D1; for the gridded metallic wires of the touch electrodes in the display region, the spacing between adjacent metallic wires in the row direction and the spacing between adjacent metallic wires in the column direction are both set as D2, and D1<D2. Exemplarily, referring to FIG. 1c, the spacing L between adjacent metallic wires in the row direction is the same as the spacing H between adjacent metallic wires in the column direction, by decreasing the value of L and H, the grid density of the touch electrode wires is improved, thereby enhancing the touch sensitivity at the edge of the display region of the touch display apparatus. It should be noted, the grid density of the touch electrode wires in the slope region may also be increased by not only increasing the line width of the metallic wires of the touch electrodes but also decreasing the spacing between the metallic wires of the touch electrodes.

Since the thickness of the touch display apparatus in the slope region is gradually decreased along the direction far away from the display region, the distance between the touch electrodes in the touch electrode layer and the touch object (e.g., the finger) is gradually increased. As a result, the strength of the touch signal formed between the touch electrode in the frame region and the touch object is gradually decreased. Therefore, the grid density of the touch electrodes in the slope region is set to be increased gradually along the direction far away from the display region, so that the touch sensitivity of the touch display apparatus at the edge of the display region can be effectively improved.

It should be noted that the above contents are only preferred embodiments of the present disclosure and the applied technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A touch display apparatus having a display region and a frame region, comprising:
    a base substrate, a display function layer and a thin film encapsulation layer which are sequentially stacked, wherein the display function layer is located in the display region; the thin film encapsulation layer is arranged to cover the display region and extend to the frame region;
    a touch electrode layer, wherein the touch electrode layer is arranged at a side, facing away from the base substrate, of the thin film encapsulation layer, and is arranged to cover the display region and extend to the frame region;
    wherein the frame region comprises a slope region, the slope region is adjacent to the display region, and a thickness of the touch display apparatus in the slope region is gradually decreased along a direction outward from the display region;
    wherein the touch electrode layer comprises touch electrodes arranged to cover the display region and extend to the slope region, and each of the touch electrodes is constructed of gridded metallic wires; and a grid density of the touch electrodes located in the slope region is higher than the grid density of the touch electrodes located in the display region.

2. The touch display apparatus according to claim 1, wherein the touch electrode layer comprises a plurality of touch electrode blocks arranged at a same layer, and the plurality of touch electrode blocks are arranged in an array.

3. The touch display apparatus according to claim 2, wherein the touch electrode layer further comprises a plurality of touch electrode wires, and the plurality of touch electrode wires and the plurality of touch electrode blocks are arranged at the same layer;
wherein each of the plurality of touch electrode blocks is electrically connected with at least one of the plurality of touch electrode wires, and is electrically insulated with the other touch electrode wires.

4. The touch display apparatus according to claim 2, wherein an area of any touch electrode block, at least a part of which is located in the slope region, is S1, and the area of any touch electrode block located in the display region is S2, wherein S1>S2.

5. The touch display apparatus according to claim 1, wherein the thin film encapsulation layer comprises at least one organic layer and at least one inorganic layer; and
wherein the touch electrode layer is arranged at a surface, facing away from the base substrate, of one of the at least one organic layer or one of the at least one inorganic layer of the thin film encapsulation layer.

6. The touch display apparatus according to claim 1, wherein the thin film encapsulation layer comprises a first inorganic layer, an organic layer and a second inorganic layer in sequence.

7. The touch display apparatus according to claim 6, wherein the touch electrode layer is arranged at a surface, facing away from the base substrate, of one of the organic layer, the first inorganic layer and the second inorganic layer of the thin film encapsulation layer.

8. The touch display apparatus according to claim 6, further comprising at least one annular barrier wall, wherein the at least one annular barrier wall is located in the frame region and is arranged to encompass the display region.

9. The touch display apparatus according to claim 8, wherein the at least one annular barrier wall comprises a first barrier wall adjacent to the display region and a second barrier wall encompassing the first barrier wall;
wherein the organic layer extends to a region between the display region and the first barrier wall; and
wherein both of the first inorganic layer and the second inorganic layer extend to a region between the first barrier wall and the second barrier wall.

10. The touch display apparatus according to claim 1, wherein the touch electrode layer comprises a plurality of touch sensing electrodes and a plurality of touch driving electrodes, and the plurality of touch sensing electrodes and the plurality of touch driving electrodes are insulated and arranged at a same layer;
wherein the plurality of touch sensing electrodes or the plurality of touch driving electrodes are connected through a bridge connector, and the bridge connector and the plurality of touch sensing electrodes or the plurality of touch driving electrodes are located in different layers;
wherein an electrode insulation layer is provided between the bridge connector and the touch electrode layer, and is configured to make the touch driving electrode and the touch sensing electrode be insulated.

11. The touch display apparatus according to claim 1, wherein the touch electrode layer comprises a plurality of touch sensing electrodes arranged in a layer and a plurality of touch driving electrodes arranged in another layer; and
an insulation layer is sandwiched between the plurality of touch sensing electrodes and the plurality of touch driving electrodes.

12. The touch display apparatus according to claim 11, wherein the plurality of touch driving electrodes are arranged in parallel to form a touch driving electrode column, and the plurality of touch sensing electrodes are arranged in parallel to form a touch sensing electrode column; and
wherein the touch driving electrode column and the touch sensing electrode column intersect and insulate from each other.

13. The touch display apparatus according to claim 1, further comprising a protective layer arranged at a side, facing away from the base substrate, of the thin film encapsulation layer.

14. The touch display apparatus according to claim 13, wherein the protective layer is at least one of a protective cover plate, a barrier film and a resin layer.

15. The touch display apparatus according to claim 13, wherein the slope region has two ends: a first end close to the display region and a second end facing away from the display region, and grids of the touch electrodes located in the slope region are evenly distributed;
wherein a ratio of the grid density of the touch electrodes in the slope region to the grid density of the touch electrodes in the display region meets the following formulations:

$$\rho2/\rho1=d/d1, d=(d2-d1)/(\ln(d2)-\ln(d1))$$

wherein $\rho1$ is the grid density of the touch electrodes in the display region; $\rho2$ is the grid density of the touch electrodes in the slope region; d1 is a distance between a surface, facing away from the touch electrodes, of the protective layer and the first end; d2 is a distance between a surface, facing away from the touch electrodes, of the protective layer and the second end.

16. The touch display apparatus according to claim 1, wherein the touch electrode layer comprises a plurality of touch sensing electrodes, and an area of any touch sensing electrode, at least a part of which is located in the slope region, is S3, and the area of any touch sensing electrode located in the display region is S4, wherein S3>S4.

17. The touch display apparatus according to claim 16, wherein the touch electrode layer further comprises a plurality of touch driving electrodes, and the area of any touch driving electrode, at least a part of which is located in the slope region, is S5, and the area of any touch driving electrode located in the display region is S6, wherein S5>S6.

18. The touch display apparatus according to claim 1, wherein the touch electrode layer comprises a plurality of touch driving electrodes, and the area of any touch driving electrode, at least a part of which is located in the slope region, is S5, and the area of any touch driving electrode located in the display region is S6, wherein S5>S6.

19. The touch display apparatus according to claim 1, wherein a line width of one metallic wire of the touch electrodes in the slope region is larger than a line width of the metallic wire of the touch electrodes in the display region.

20. The touch display apparatus according to claim 1, wherein for the gridded metallic wires of the touch electrodes in the slope region, both of a spacing between adjacent metallic wires in a row direction and a spacing between adjacent metallic wines in a column direction are D1; for the gridded metallic wires of the touch electrodes in the display region, both of the spacing between adjacent metallic wires in the row direction and the spacing between adjacent metallic wires in the column direction are D2, wherein D1<D2.

21. The touch display apparatus according to claim 1, wherein the grid density of the touch electrodes in the slope region is gradually increased along the direction outward from the display region.

22. The touch display apparatus according to claim 1, wherein the grid density ρ of the touch electrodes is calculated as follows:

$$\rho = (LW + HW - W^2)/LH$$

wherein W is a line width of the metallic wires; L is a spacing between adjacent metallic wires in a row direction among the metallic wires; H is a spacing between adjacent metallic wires in a column direction among the metallic wires.

\* \* \* \* \*